Feb. 24, 1948.  W. L. ISOM  2,436,648
CATCHER FOR FRUIT AND NUT GATHERERS
Filed Jan. 26, 1946  2 Sheets-Sheet 2

INVENTOR
Walter L. Isom
BY
ATTORNEYS

Patented Feb. 24, 1948

2,436,648

UNITED STATES PATENT OFFICE 2,436,648

CATCHER FOR FRUIT AND NUT GATHERERS

Walter L. Isom, Crows Landing, Calif.

Application January 26, 1946, Serial No. 643,639

3 Claims. (Cl. 56—329)

This invention relates to, and it is an object to provide, an improved walnut harvester operative to catch the nuts as knocked from a tree, and to then convey such nuts for discharge into a transport vehicle.

Another object of this invention is to provide a walnut harvester which comprises a pair of relatively large-size, wheel supported conveyor beds adapted to be disposed on opposite sides of the trunk of a tree so as to catch nuts knocked therefrom; one of said conveyor beds being fitted with longitudinally extending nut deflector hoods arranged to span the gaps between the adjacent sides of the conveyor beds ahead and to the rear of the trunk when said beds are in place for use; said deflector hoods being operative to deflect, onto the beds, such nuts as would otherwise drop through said gaps onto the ground.

A further object is to provide each of the nut catching conveyor beds with a carry-off conveyor system arranged to receive nuts from the conveyor bed and to deliver them to an elevated point for discharge into a transport vehicle.

An additional object of the present invention is to provide a walnut harvester, as in the preceding paragraph, in which said carry-off system includes a blower arranged to separate leaves and trash from the nuts in advance of their discharge from the harvester.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
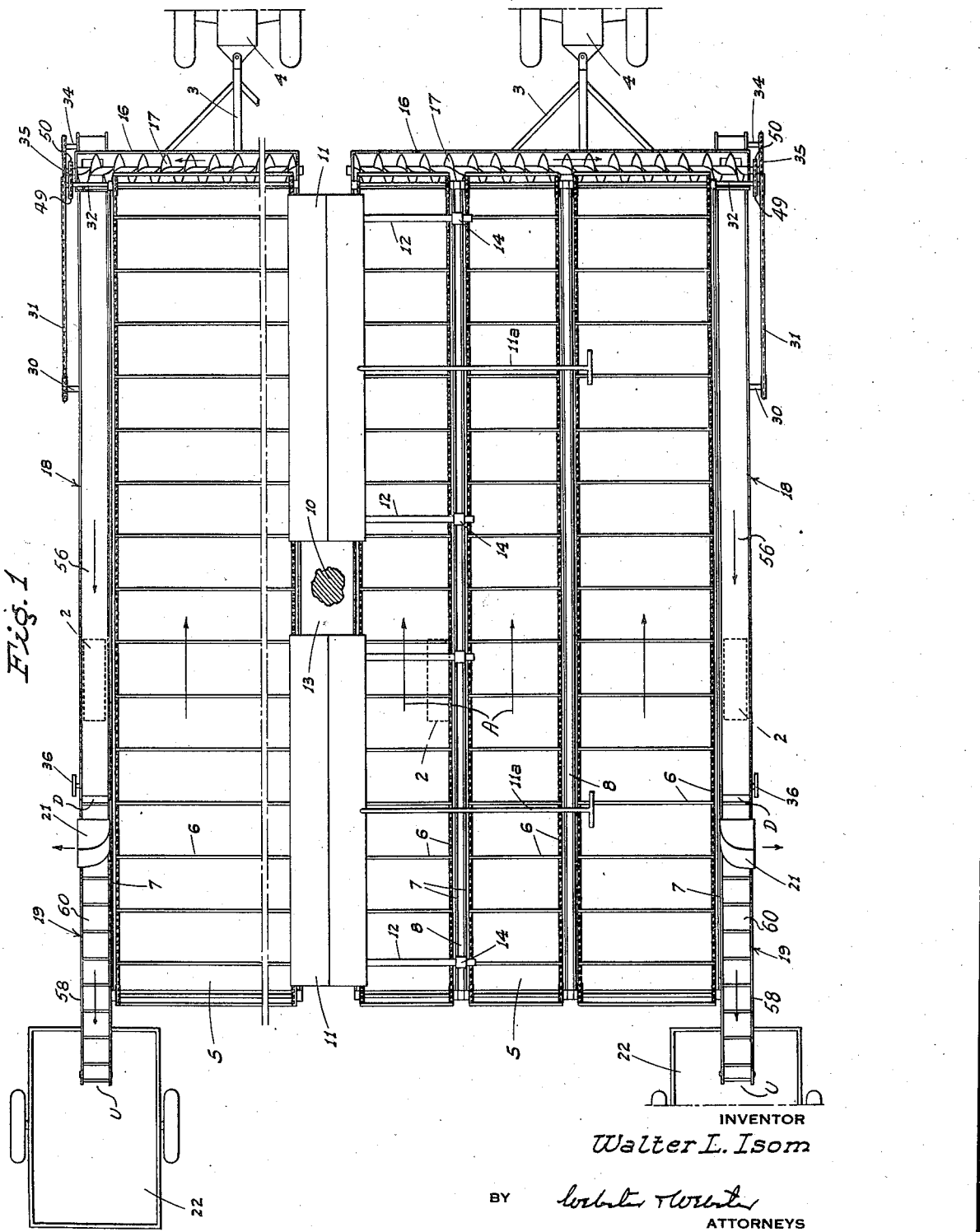
Figure 1 is a plan view of the harvester as in use; one of the conveyor beds being broken to facilitate disclosure.
Figure 2:
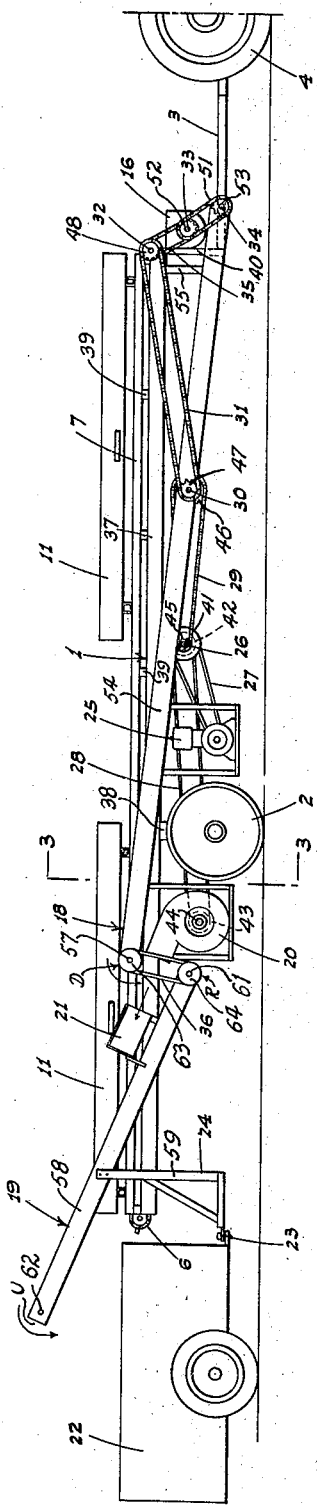
Figure 2 is a side elevation of one of the wheel-supported conveyor beds and the corresponding carry-off conveyor system.

Referring now more particularly to the characters of reference on the drawings, the harvester comprises a pair of separate, relatively large main frames 1 of rectangular configuration, and disposed substantially horizontally. This main frame includes longitudinally disposed beams 37 suitably supported by bolsters 38 from the axle 2a on the ends of which are journaled supporting wheels 2. On the longitudinally disposed beams are a plurality of transversely disposed cross beams 39. At the front end of the beams 37 there are provided downward projecting brackets 40 to which is connected a draft tongue 3 arranged for connection with a tractor 4.

As the harvesting mechanisms mounted on the frames 1 are alike, with the exception of a hood arrangement, which will hereinafter be described in detail, a description of only one of such mechanisms will suffice.

Each frame 1 supports a power driven conveyor bed, indicated generally at 5, and which conveyor bed includes a plurality of power driven endless drapers 6 disposed in adjacent side by side relation and all running lengthwise of said frame. The upper runs of the endless drapers 6 are carried on facing angle irons 7 fixed in connection with spacing beams 8 of the main frame. Similarly, the lower runs of said endless drapers are connected in facing angle irons 9.

Figure 3:
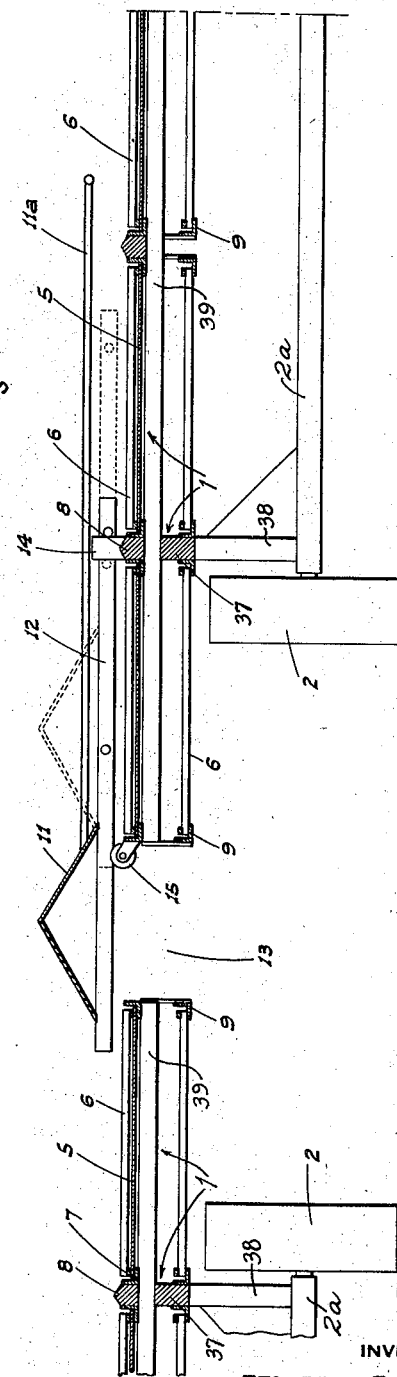
Figure 3 is a fragmentary transverse elevation, partly in section, illustrating the slidably mounted hoods which span the gaps between adjacent sides of the conveyor beds when the harvester is in use.

When the harvester is in use the wheel-supported frames 1 are disposed in adjacent parallel relation but on opposite sides of the trunk 10 of the tree from which the nuts are to be harvested. One of said frames is fitted above the conveyor bed 5 with a pair of longitudinally extending, laterally shiftable nut deflector hoods 11 carried on the outer end portions of corresponding pairs of slide beams or rods 12, whereby said hoods may be slid from an inoperative position, as shown in dotted lines in Fig. 3, to an operative position, as shown in full lines in said figure, spanning the gaps 13 between adjacent sides of the respective conveyor beds 5 ahead and to the rear of the tree trunk 10. The slide rods 12 run through guides 14 adjacent the inner ends and rest on rollers 15 adjacent their outer ends. When the hoods 11 are in operative position they deflect onto the conveyor beds 5 the nuts which would otherwise drop through the gaps 13 onto the ground.

The nuts as knocked from the tree by any suitable shaker means fall onto the conveyor beds 5, which are driven in the direction shown by the arrows A in Fig. 1 toward the forward end of the frames 1. At the forward end of each frame 1 the nuts fall into a transversely extending trough 16, and are therein fed, by an auger conveyor or the like 17, toward the laterally outer end of said trough. At the laterally outer end of the trough the nuts fall from the latter onto the lower end of a rearwardly and upwardly inclined, endless elevator conveyor 18 which extends along the outside of, and is mounted in connection with, the main frame 1. The endless elevator conveyor 18 terminates short of the rear end of the main frame, and discharges downwardly onto the lower end of another endless elevator conveyor 19 mounted in rearwardly inclined position on the rear end portion of the main frame. The distance between the upper discharge end D of the elevator conveyor 18 and the lower receiving end R of the elevator conveyor 19 is substantial, and a blower or fan 20 is mounted in connection with the main frame 1 in position to create a blast of air above and substantially parallel to the elevator conveyor 19 and through the stream of nuts falling onto the lower end of the same. This stream of air separates leaves and trash from the nuts, and such leaves and trash are discharged laterally of the main frame by means of a deflector 21 against which the air blast impinges.

From the upper end of the elevator conveyor 19, which is disposed some distance to the rear of the main frame 1, said elevator conveyor discharges into a two-wheel trailer 22 releasably coupled by a hitch 23 to a bracket 24 fixed on the main frame 1 adjacent the rear thereof. When one trailer 22 is filled with nuts, it is detached and another trailer replaced.

The endless drapers 6 of the conveyor bed 5 on each main frame, together with the described conveyor system associated therewith, are driven from an engine 25 suspended from the main frame. The drive connections from said engine comprise the following:

The engine 25 drives a countershaft 26 by means of an endless belt 27 connected in driving relation with a pulley 41 fixed to said shaft 26. Another pulley 42 is fixed to the countershaft 28 and a belt connects such pulley with a pulley 43 on the shaft 44 of the fan or blower 20. An endless chain 29 connects a sprocket 45 on the countershaft 26 with a sprocket 46 on a shaft 30 ahead thereof. Another endless chain 31 connects a sprocket 47 on the shaft 30 with a sprocket 48 on a front drive shaft 32 which is common to all of the endless drapers 6. The drive shaft 33 of the auger conveyor 17 is driven by a chain 35 which connects a sprocket 49 on the shaft 32 in driving relation with a sprocket 50 on the shaft 33. The shaft 34 of the elevator conveyor 18 is driven by a chain 51 connecting a sprocket 52 on the shaft 33 in driving relation with a sprocket 53 on the shaft 34. The elevator conveyor 18 comprises a trough 54 supported by a bracket 55 from the forward end of the frame 1. In this trough is an endless conveyor belt 56 mounted in driving relation about the shaft 34 at its lower end and about a shaft 57 journaled in the upper end of such trough. The elevator conveyor 19 comprises a trough 58 supported on a bracket 59 fixed to the rear end of the frame 1. In this trough is an endless conveyor belt 60 mounted in driving relation about a shaft 61 journaled in the lower or receiving end R of the trough 58 and a shaft 62 journaled in the upper end U of the trough. The shaft 61 is driven by a belt 36 connected in driving relation between a pulley 63 on the shaft 57 and a pulley 64 on the shaft 61.

With my improved walnut harvester, including the separate but cooperative conveyor beds and corresponding conveyor systems, walnuts can be harvested from the trees in a practical and efficient manner, economically, and without the necessity of recovery of such nuts from the ground.

For movement or transport of the frame supported conveyor beds 5 and corresponding conveyor systems from one tree to another, the nut deflector hoods 11 are first retracted to their inoperative position and then both tractors 4 are advanced until the conveyor beds 5 are disposed in proper nut receiving position below the next tree, whereupon harvesting of the nuts therefrom is effected in the manner described, but only after the hoods 11 have been returned to position overhanging the gaps 13.

In order to facilitate adjustment of the heads 11 each one is provided with a handle rod 11a which projects parallel to beams 12 across the corresponding frame 1 some distance. By this means, the heads may be moved to and from position by an operator standing on the far side of the harvester.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A catcher for nuts comprising a substantially horizontal wheel supported frame, a plurality of longitudinally disposed endless drapers supported on the frame and being movable in one direction to a point of discharge, an auger conveyor supported on the frame at one end of and transversely of the drapers and into which conveyor the drapers discharge, an elevator conveyor mounted on the frame along side of the drapers and being movable to a point of discharge, and onto which elevator conveyor the auger conveyor discharges, and means carried on the frame and operably connected with said drapers and conveyors to drive the same.

2. A catcher as in claim 1 including a second elevator conveyor carried by the frame, the discharge end of said first named elevator conveyor and the receiving end of the second named elevator conveyor being spaced apart vertically, a fan supported on the frame and having its discharge end directed toward the space between said elevator conveyors, means to drive the fan, and a deflector mounted on the frame above the second named elevator conveyor and in line with the discharge end of the fan.

3. A catcher as in claim 1 including an inclined deflector hood supported on the frame in a plane above the plane of the drapers and extending longitudinally of said drapers, and means to project the hood laterally out beyond one side edge of said drapers.

WALTER L. ISOM.

REFERENCES CITED

The following references are of record in the file of this patent:

UNITED STATES PATENTS

| Number | Name | Date |
|---|---|---|
| 1,445,596 | Johnston | Feb. 13, 1923 |
| 1,473,081 | Cook | Nov. 6, 1923 |
| 2,386,881 | Phillips | Oct. 16, 1945 |